(12) United States Patent
Utsumi et al.

(10) Patent No.: US 7,317,588 B2
(45) Date of Patent: Jan. 8, 2008

(54) STORAGE DEVICE, DATA-ASSURANCE CONTROL DEVICE, AND DATA ASSURANCE METHOD

(75) Inventors: Tomoo Utsumi, Kawasaki (JP); Yasuto Aramaki, Kawasaki (JP); Hiroyuki Chiba, Kawasaki (JP); Nobuaki Yoshitake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/524,074

(22) Filed: Sep. 20, 2006

(65) Prior Publication Data
US 2007/0273999 A1 Nov. 29, 2007

(30) Foreign Application Priority Data
May 25, 2006 (JP) .............................. 2006-145927

(51) Int. Cl.
*G11B 5/09* (2006.01)
(52) U.S. Cl. ...................................................... 360/53
(58) Field of Classification Search ................. 360/53, 360/77.01, 75, 55, 69, 77.04, 46, 66, 77.05, 360/31
See application file for complete search history.

(56) References Cited
U.S. PATENT DOCUMENTS 5,185,681 A * 2/1993 Volz et al. ............... 360/77.05
5,455,724 A * 10/1995 Suzuki et al. ............. 360/77.04
5,521,773 A * 5/1996 Suzuki et al. ............. 360/77.04
5,592,347 A * 1/1997 Mori et al. ............... 360/77.04
5,926,337 A * 7/1999 Itou et al. ................. 360/77.04
6,078,454 A * 6/2000 Takahashi et al. ............ 360/66
6,295,175 B1 * 9/2001 Tomita et al. ................. 360/31
6,476,992 B1 * 11/2002 Shimatani ..................... 360/46
2004/0078738 A1 4/2004 Kim et al.

FOREIGN PATENT DOCUMENTS

JP 2001-118343 4/2001
JP 2004-134077 4/2004

* cited by examiner

*Primary Examiner*—Fred F. Tzeng
(74) *Attorney, Agent, or Firm*—Greer, Burns & Crain, Ltd.

(57) ABSTRACT

A data reading unit reads inner offset data from an offset reading in an inner direction toward a center of a storage medium and outer offset data from an offset reading in an outer direction toward a circumference of the storage medium. A data comparing unit compares the inner offset data and the outer offset data read by the data reading unit. A data-output control unit that outputs the read-data when a result of comparison by the data comparing unit indicates that the inner offset data matches the outer offset data.

20 Claims, 10 Drawing Sheets

FIG.9

| bit | CONTENT | SETTING VALUE | SETTING CONTENT |
|---|---|---|---|
| bit 0 | VERIFICATION PERMITTED WHEN DIFFERENT DATA IS SUCCESSFULLY READ BY BOTH INNER OFFSET READING AND OUTER OFFSET READING | 0 | ERROR IS REPORTED WITHOUT PERFORMING VERIFICATION |
| | | 1 | VERIFICATION IS PERFORMED TO FIND WHICH IS VALID DATA |
| bit 1 | VERIFICATION PERMITTED WHEN DATA IS SUCCESSFULLY READ IN EITHER INNER OFFSET READING OR OUTER OFFSET READING | 0 | DATA IS TRANSMITTED WITHOUT PERFORMING VERIFICATION (ENDS NORMALLY) |
| | | 1 | VERIFICATION IS PERFORMED TO FIND IF ANY OTHER DATA EXISTS IN SAME TRACK |
| bit 2 | DATA DESTRUCTION IS PERMITTED WHERE THERE IS ERROR | 0 | OVERWRITE IS NOT PERFORMED WHEN ERROR IS DETECTED |
| | | 1 | OVERWRITE WITH UNREADABLE DATA WHEN ERROR IS DETECTED |
| bit 3 | OVERWRITE IS PERMITTED WHEN TRANSMITTING DATA | 0 | OVERWRITE IS NOT PERFORMED WHEN THERE IS NORMAL READING |
| | | 1 | OVERWRITE TRANSMITTED DATA |

STORAGE DEVICE, DATA-ASSURANCE CONTROL DEVICE, AND DATA ASSURANCE METHOD

BACKGROUND OF THE INVENTION

1. Field of the Invention

The present invention relates to a technology for assuring data read by an offset-reading retry process by offsetting in an inner direction toward a center of a storage medium and an outer direction toward a circumference of the storage medium, when a read-error occurs near a track center of the storage medium.

2. Description of the Related Art

In recent years, to increase the speed and reliability of reading data, a read-head of a magnetic disk device has become smaller, and even smaller than a write-head. This is because a core of the read-head can be smaller without decreasing the reading capability by using Magneto Resistive (MR), Giant Magneto Resistive (GMR), or Turning Magneto Resistive (TMR), whereas the core of the write-head can be made small to a certain extent because too small size of the write-head degrades the signal to noise ratio (SNR) of the write-head.

Ideally, the data is written along a track centerline of the magnetic disk. However, an arm that supports the heads vibrates slightly and accordingly the read-head also vibrates, resulting in an offset-writing in which the data is written away from the track centerline.

When new data is written on top of old data by the offset-writing, both the old data and the new data can be readably present near the track centerline. This is due to an offset of the offset-writing. In other words, this is caused by the new data being offset-written over a part of the old data readably left because the old data is not completely overwritten with the new data due to the deviation of the written data from the track centerline.

When the new data is offset written on top of the old data, an edge of the offset-written data can be positioned near the track centerline. When the read-head tries to read-data without offsetting, a read-error can occur.

As a method for addressing such a read-error, a method of reacquiring data by changing an offset amount according to read gain is disclosed in Japanese Patent Application Laid-open No. 2004-134077, for example.

Furthermore, Japanese Patent Application Laid-open No. 2001-118343 discloses a magnetic disk that can read-data without performing offset-reading if a read-error occurs when the data can be recovered by offset-reading, once the data in a sector that can be read by offset-reading and the neighboring sectors are saved and rewritten to the original sector without offsetting.

However, with the conventional techniques represented by the disclosures in Japanese Patent Application Laid-Open No. 2004-134077 and No. 2001-118343, when new data is overwritten on old data by offset-writing, and both of the new data and the old data can be read due to the difference in the offset amount, it is not known which the new data is.

Specifically, when new data is offset-written in an outer direction toward the circumference of the magnetic disk over the old data written on the track centerline with an offset amount of zero, data read by offset-reading in an inner direction toward the center of the magnetic disk is the old data, and data read by offset-reading in the outer direction is the new data.

Under these conditions, it cannot be determined which data is the correct data at the stage where data is read for the first time. Thus, it is required to assure the data read by offset-reading when a data read-error occurs on the track centerline.

SUMMARY OF THE INVENTION

It is an object of the present invention to at least partially solve the problems in the conventional technology.

A storage device according to one aspect of the present invention performs an assurance of read-data that is read by an offset-reading retry process of retrying an offset reading in an inner direction toward a center of a storage medium and in an outer direction toward a circumference of the storage medium, when a data read-error occurs near a track center of the storage medium. The storage device includes a data reading unit that reads inner offset data from an inner-direction offset reading and outer offset data from an outer-direction offset reading; a data comparing unit that compares the inner offset data and the outer offset data read by the data reading unit; and a data-output control unit that outputs the read-data when a result of comparison by the data comparing unit indicates that the inner offset data matches the outer offset data.

A data-assurance control apparatus according to another aspect of the present invention performs an assurance of read-data that is read by an offset-reading retry process of retrying an offset reading in an inner direction toward a center of a storage medium and in an outer direction toward a circumference of the storage medium, when a data read-error occurs near a track center of the storage medium. The data-assurance control apparatus includes a data comparing unit that compares inner offset data read from an inner-direction offset reading and outer offset data read from an outer-direction offset reading; and a data-output control unit that outputs the read-data when a result of comparison by the data comparing unit indicates that the inner offset data matches the outer offset data.

A read-data assurance method according to still another aspect of the present invention is for performing an assurance of read-data that is read by an offset-reading retry process of retrying an offset reading in an inner direction toward a center of a storage medium and in an outer direction toward a circumference of the storage medium, when a data read-error occurs near a track center of the storage medium. The read-data assurance method includes reading inner offset data from an inner-direction offset reading and outer offset data from an outer-direction offset reading; comparing the inner offset data and the outer offset data read at the reading; and outputting the read-data when a result of comparison at the comparing indicates that the inner offset data matches the outer offset data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a chart of setting contents of a 4-bit parameter relating to an offset retry method.

DETAILED DESCRIPTION OF THE PREFERRED EMBODIMENTS

Exemplary embodiments of the present invention will be explained below in detail with reference to the accompanying drawings. The embodiments explained below are applied to a magnetic disk device connected to a host computer. However, the invention is not limited to this, and can be widely applied to storage devices such as a magnetic optical disk device.

Figure 1:
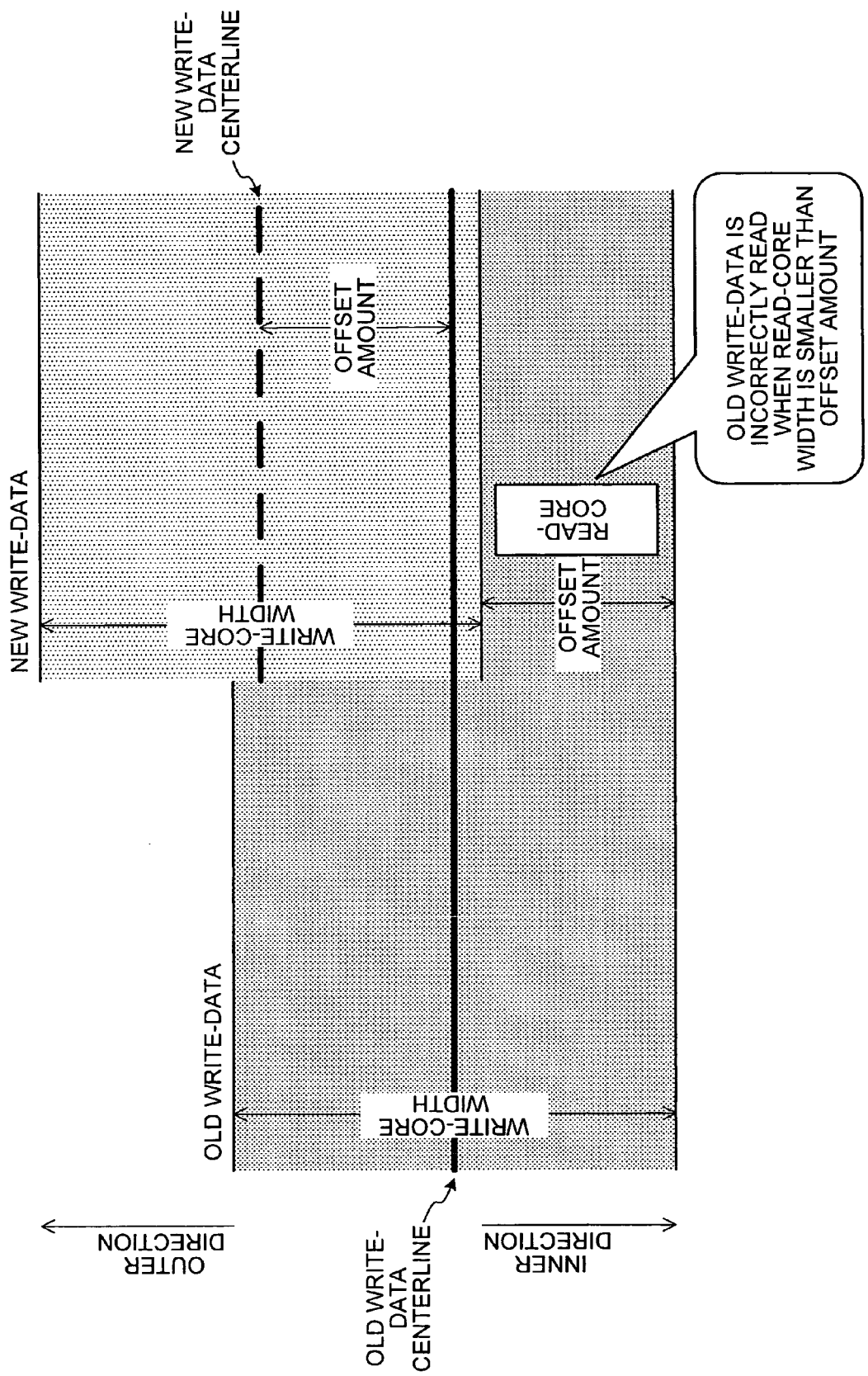
FIG. 1 is a schematic diagram for explaining a problem in offset-reading according to a conventional technique.

FIG. 1 is a schematic diagram for explaining a problem in offset-reading according to a conventional technique. Old write-data is written to the magnetic disk so that the centerline of the old write-data and the track centerline of the magnetic disk match. New write-data is overwritten on the old write-data. Because the write-core width of the old write-data and the write-core width of the new write-data are equal, the data width of the old write-data and the data width of the new write-data match. The new write-data is offset-written in an outer direction toward a circumference of the magnetic disk by the offset amount as shown in FIG. 1. The offset amount is equal to the "difference" between the old write-data centerline and the new write-data centerline. The offset amount is also equal to the "difference" between the boundary line of the "inner direction" side of the old write-data and the boundary line of the "inner direction" side of the new write-data.

The read-core width is generally smaller in comparison with the write-core width. Thus, as shown in FIG. 1, if the offset amount is smaller than the read-core width, there is a concern that the old write-data is read by offset-reading in the track and the sector where the new write-data is offset-written. In other words, the old write-data can be incorrectly read when the read-core width is smaller than the offset amount.

The present invention has been achieved to overcome this problem. In particular, when data reading fails near the track centerline and rereading is performed with the read-head offset, whether the read-data read by offset-reading is correct is determined.

It has been described above that if the offset amount is smaller than the read-core width, there is a concern that the old write-data is read by offset-reading in the track and the sector where the new write-data is offset-written. Although they are narrow, there are unreadable parts at the edges of the write-core in the inner direction and the outer direction, which cannot be read by the read-core. When the "offset width" is equal to the read-core width, the edge of the read-core partially overlaps the unreadable part and thus, the read-error occurs.

Figure 2:
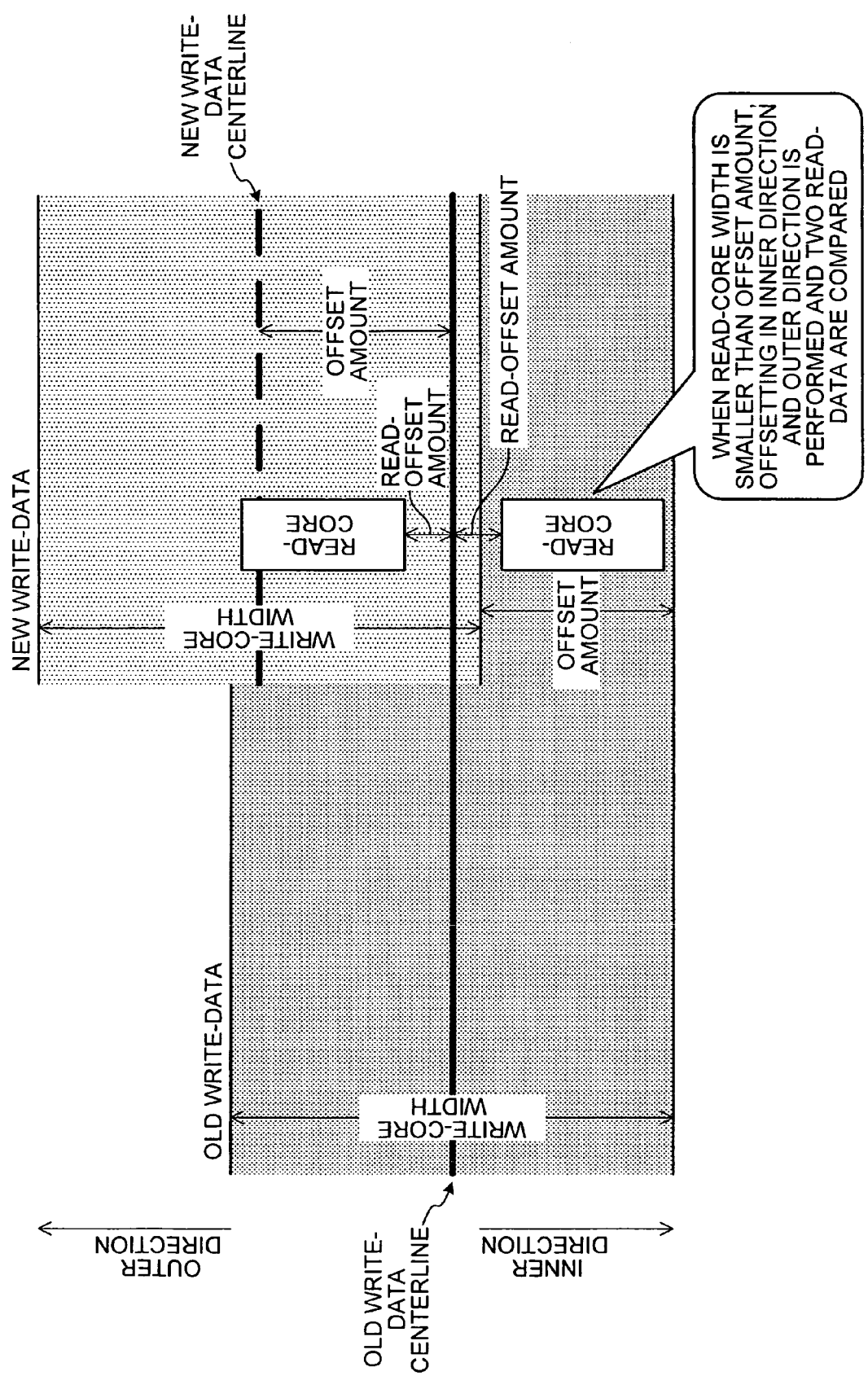
FIG. 2 is a schematic diagram for explaining features of offset-reading according to an embodiment of the present invention.

FIG. 2 is a schematic diagram for explaining features of offset-reading according to an embodiment of the present invention. When a read-error occurs near the track centerline, the data is reread with the read-core offset by the same offset amount in the inner direction and the outer direction from the old write-data centerline that matches the old write-data centerline. In this manner, when the read-core is smaller than the offset amount, assurance of read-data can be performed at the time of retrying offset-reading by comparing the two data read with the read-core offset by the same amount in the inner direction and the outer direction.

Although details will be explained later, as an example of assuring read-data when offset read is retried, if the read-data read by offset read retrying in the inner direction and the read-data read by offset read retrying in the outer direction match, it is determined that the read-data is the correct data. Thus, the correct data is output to the host computer.

Furthermore, when the read-data read by offset read retrying in the inner direction and the read-data read by offset read retrying in the outer direction do not match, it cannot be determined that the read-data is the correct data. Thus, error information is output to the host computer.

Otherwise, when the read-data read by offset read retrying in the inner direction and the read-data read by offset read retrying in the outer direction do not match, data reading is retried with the offset amount being increased stepwise by the same amount in the inner direction and the outer direction. The data present in the direction in which the read-error occurs at first is determined to be the incorrect data, and the other data is output to the host computer as the correct data. This is based on the fact that the new write-data is readable with a larger offset amount in comparison to the old write-data from the new write-data being offset-written.

Otherwise, when the read-data read by offset read retrying in the inner direction and the read-data read by offset read retrying in the outer direction do not match, data reading is retried with the offset amount decreased stepwise by the same amount in the inner direction and the outer direction. The data present in the direction in which the read-error occurs at first is determined to be the incorrect data, and the other data is output to the host computer as the correct data. This is based on the fact that the new write-data is readable with a smaller offset in comparison to the old write-data provided that the new write-data is offset-written so that the offset amount does not exceed a half of the write-core width.

As explained above, when the read-error occurs near the track center, both inner offset-reading and outer offset-reading are performed, and a next process is determined based on the result of the comparison and verification. Because the read-data is not determined based on only one of the reading of either the inner offset-reading and the outer offset-reading, the correctness of the read-data can be highly assured even when two different data can be read in the same sector of the same track due to the data being offset written.

Figure 3:
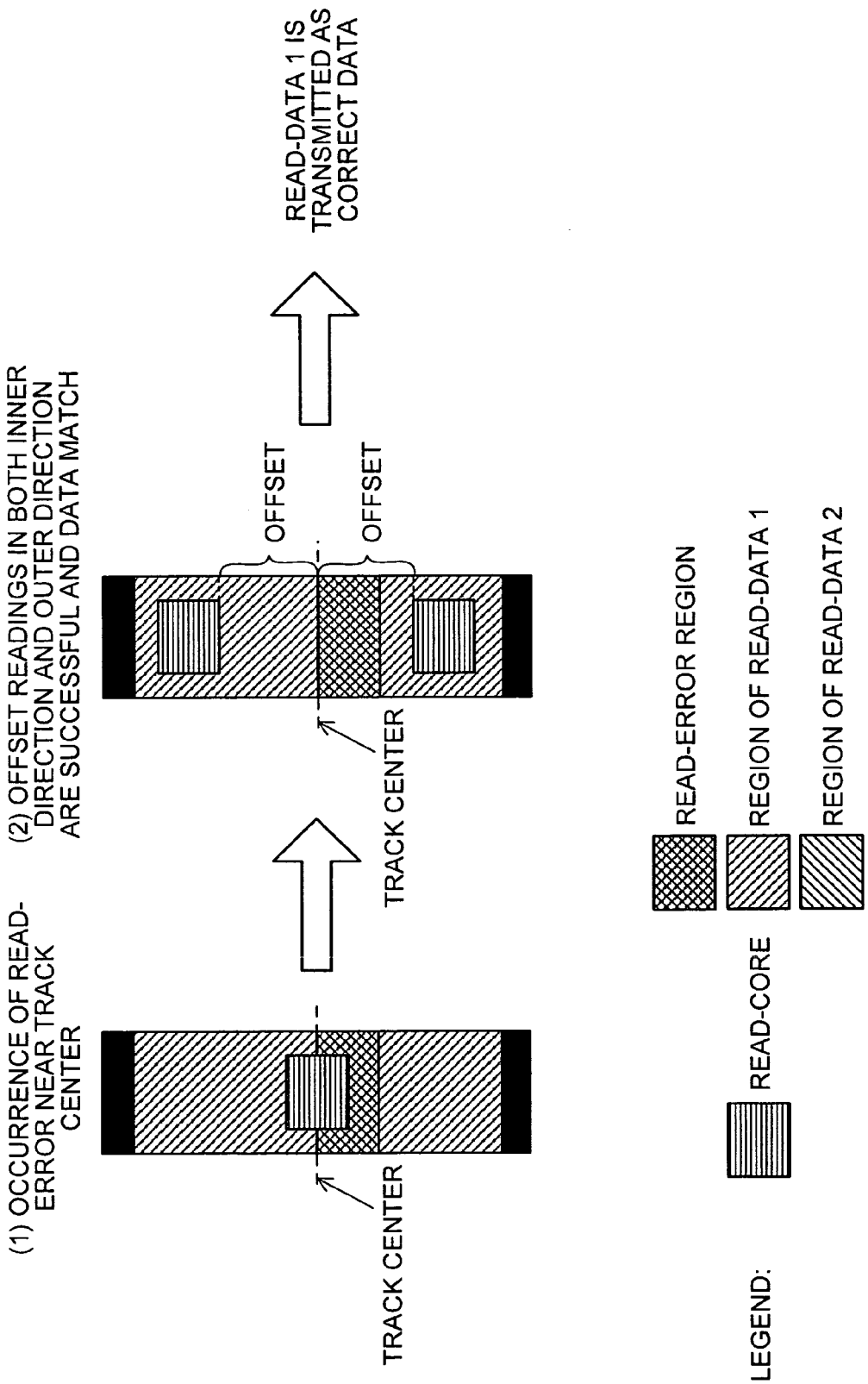
FIG. 3 is a schematic for explaining a process to be performed when an error occurs near a track center (part 1)

FIG. 3 is a schematic for explaining a process to be performed when an error occurs near a track center (part 1). There is a read-error region in which a read-error occurs near and below the track center, and a read-error occurs when the read-core tries to read this read-error region. When offset-readings by the same offset amount in the inner direction and the outer direction are both successful and the read-data from both reading is read-data 1, the read-data 1 is transmitted to the host computer as the correct data.

Figure 4:
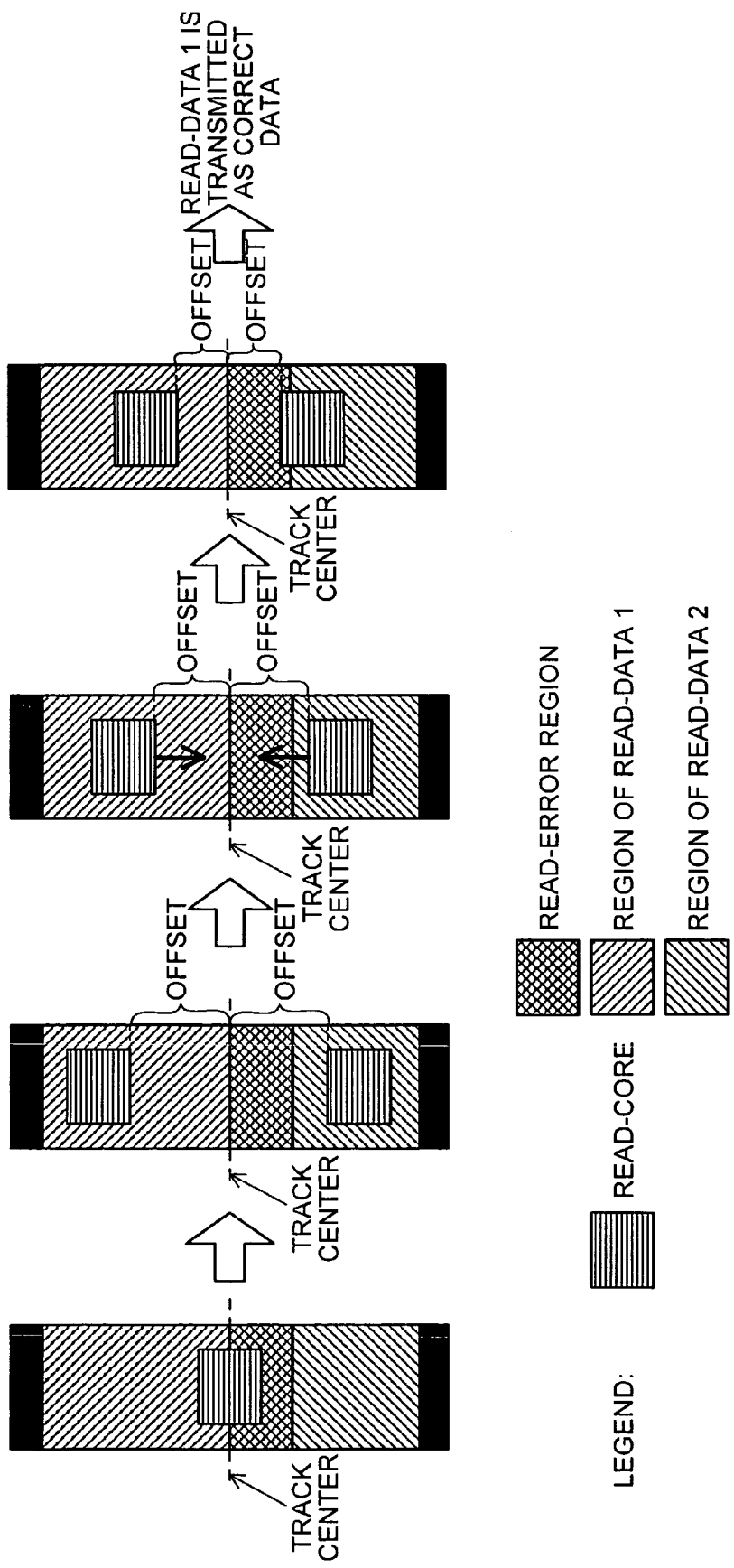
FIG. 4 is a schematic for explaining a process to be performed when an error occurs near a track center (part 2)

FIG. 4 is a schematic for explaining another process to be performed when the error occurs near the track center (part 2). There is a read-error region in which a read-error occurs near and below the track center, and the read-error occurs when the read-core tries to read the read-error region. Although offset-readings by the same offset amount in both the inner direction (central direction of the magnetic disk, lower direction in FIG. 4) and the outer direction (the circumferential direction of the magnetic disk, upper direction in FIG. 4) are successful, one of the read-data is the read-data 1 and the other is read-data 2. The data reading is continually retried with he offset amount of the inner offset-reading and the outer offset-reading reduced stepwise by the same amount. This is called reduction-offset retry reading.

When one of the inner direction and the outer direction causes the read-error at first (in FIG. 4, offset-reading in the inner direction firstly becomes an error), the offset read-data that does not cause the read-error (in FIG. 4, the read-data 1) is transmitted to the host computer as the correct data.

Figure 5:
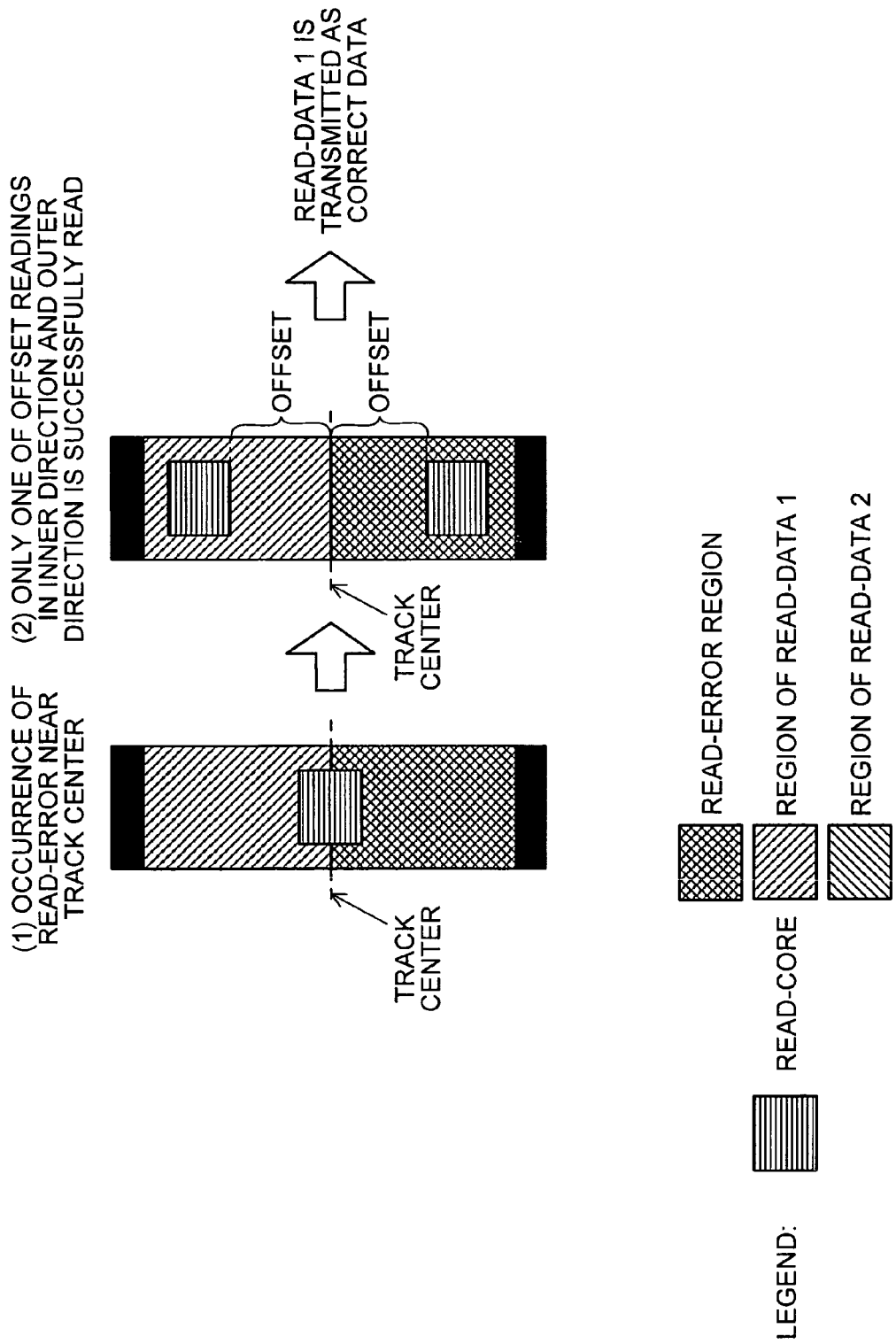
FIG. 5 is a schematic for explaining a process to be performed when an error occurs near a track center (part 3)

FIG. 5 is a schematic for explaining still another process to be performed when the error occurs near the track center (part 3). There is a read-error region in which a read-error occurs near the track center, and the read-error occurs when the read-core tries to read the read-error region. When offset-reading by the same offset amount is performed in the inner direction and the outer direction, only the offset-reading in one direction is successful (in FIG. 5, only the offset-reading in the outer direction is successful). Thus, the read-data 1 successfully read is transmitted to the host computer as the correct data.

Figure 6:
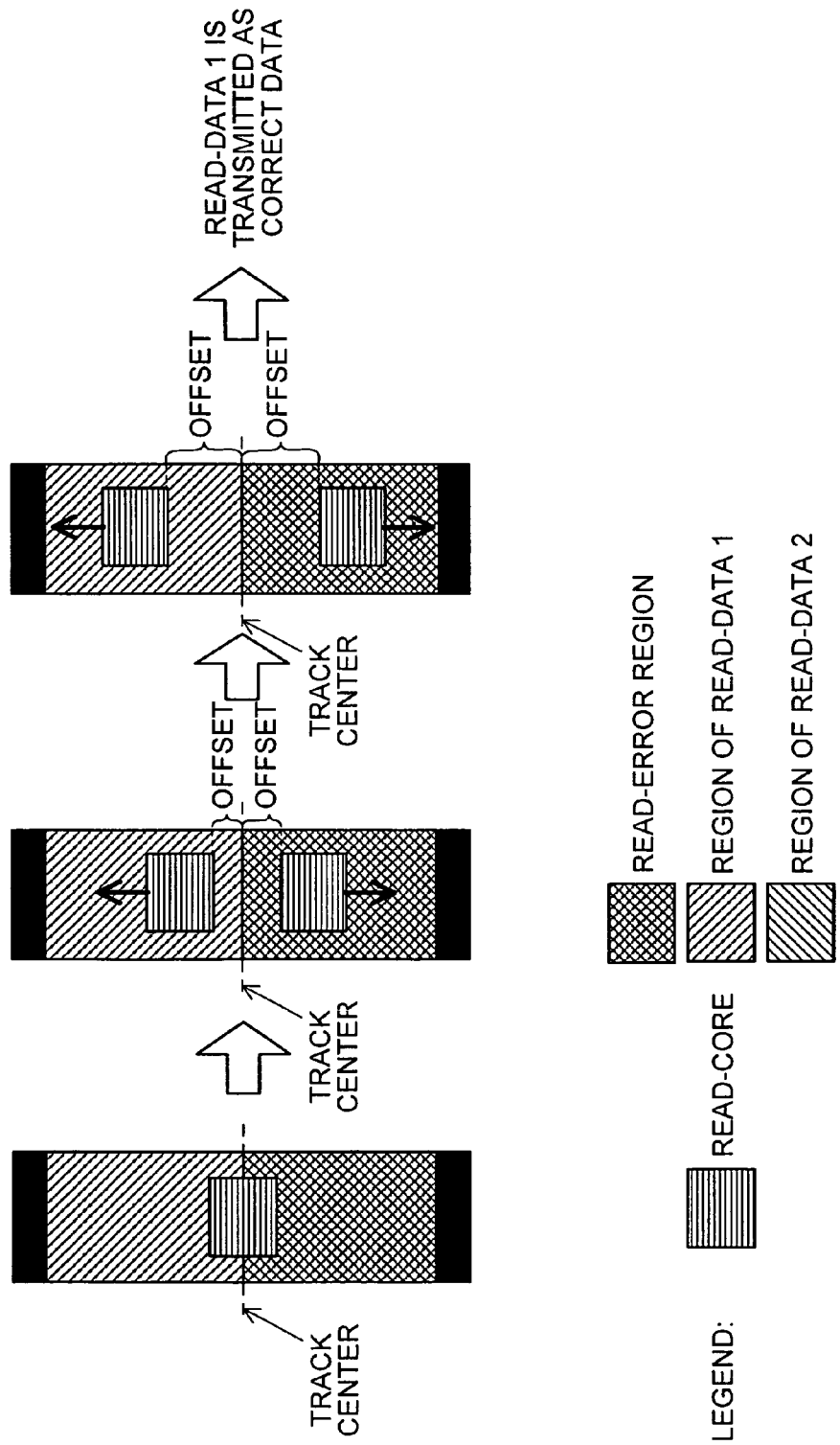
FIG. 6 is a schematic for explaining a process to be performed when an error occurs near a track center (part 4)

FIG. 6 is still another schematic for explaining a process to be performed when the error occurs near the track center (part 4). There is the read-error region in which the read-error occurs near the track center, and the read-error occurs when the read-core tries to read the read-error region. Only one of the offset-readings in the inner direction and the outer direction is successful (in FIG. 6, only the offset-reading in the outer direction is successful). Data reading is continually retried with the offset amount of the inner offset-reading and the outer offset-reading increased stepwise by the same amount. If still only one offset-reading is successful (in FIG. 6, only the offset-reading in the outer direction is successful), the read-data 1 that is successfully read is transmitted to the host computer as the correct data. This is called increase offset retry reading.

Figure 7:
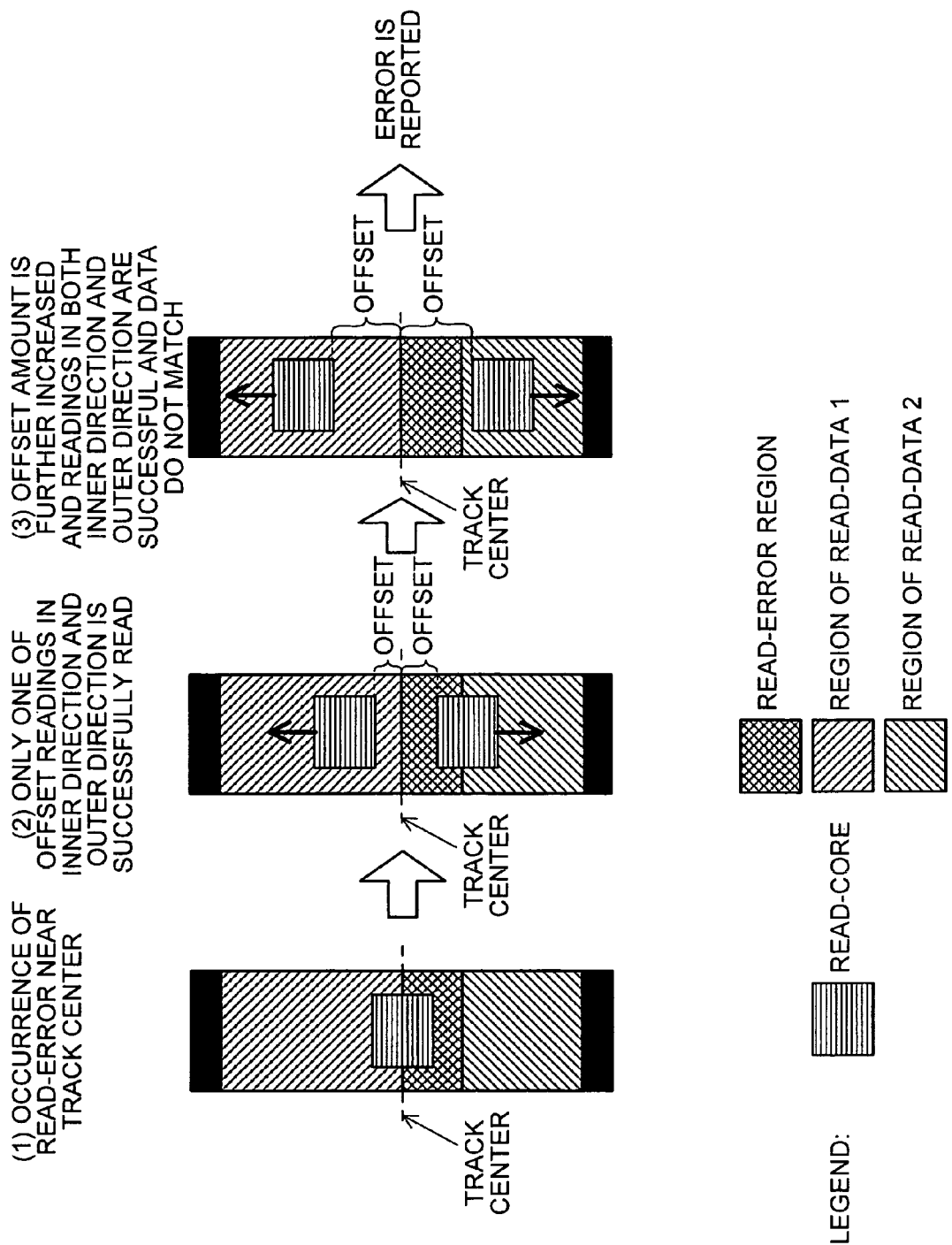
FIG. 7 is a schematic for explaining a process to be performed when an error occurs near a track center (part 5)

FIG. 7 is a schematic for explaining still another process to be performed when the error occurs near the track center (part 5). There is the read-error region in which the read-error occurs near and below the track center, and the read-error occurs when the read-core tries to read the read-error region. Only one of the offset-readings in the inner direction and the outer direction is successful (in FIG. 6, only the offset-reading in the outer direction is successful). Data reading is continually retried while increasing the offset amount of the inner offset-reading and the outer offset-reading stepwise by the same amount. Offset-readings by the same offset amount in the inner direction and the outer direction are successful, and one of the read-data is the read-data 1 and the other read-data is the read-data 2. In such a case, error information is transmitted to the host computer.

Figure 8:
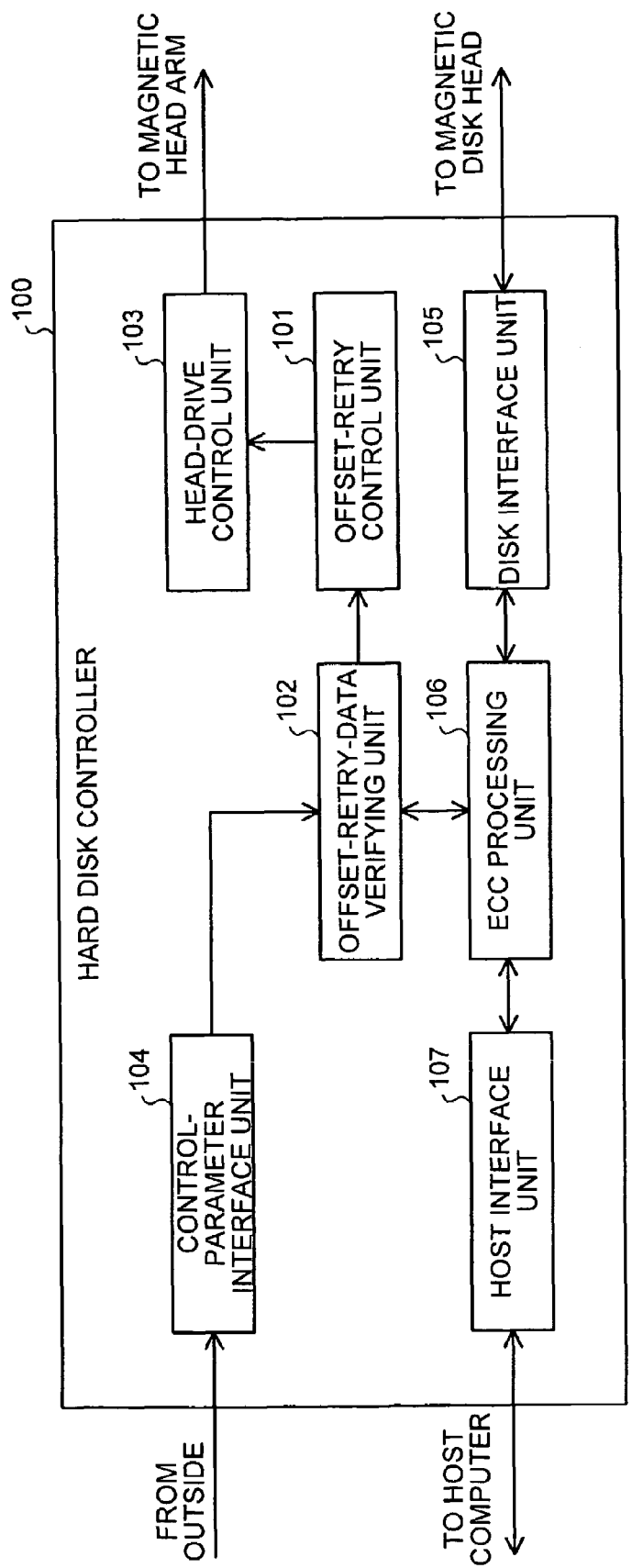
FIG. 8 is a function block diagram of a hard disk controller.

FIG. 8 is a function block diagram of the hard disk controller. A hard disk controller 100 includes an offset-retry control unit 101, an offset-retry-data verifying unit 102, a head-drive control unit 103, a control-parameter interface unit 104, a disk interface unit 105, an error-correcting-code (ECC) processing unit 106, and a host interface unit 107. The offset-retry control unit 101 and the offset-retry-data verifying unit 102 are configured as a firmware program in a microcontroller unit (MCU).

When the read-data read from the magnetic disk and passed through the disk interface unit 105, the ECC processing unit 106, and the offset-retry-data verifying unit 102 is information indicating an error, the offset-retry control unit 101 outputs an instruction to the head-drive control unit 103 to perform offset retry reading in the inner direction and the outer direction.

When the read-data by offset retry reading in the inner direction and the outer direction do not match or one of the read-data is a read-error, the offset-retry control unit 101 outputs an instruction to the head-drive control unit 103 to continue offset-reading by stepwise changing (increasing or decreasing) the offset amount by the same amount in the inner direction and the outer direction.

The offset-retry-data verifying unit 102 verifies the read-data read from the magnetic disk and passed from the disk interface unit 105 via the ECC processing unit 106. Specifically, the offset-retry-data verifying unit 102 verifies whether the read-data by offset-reading in the inner direction and the read-data by offset-reading in the outer direction are both successfully read and match, recognizes whether one of the offset-readings is successful and the other offset-reading is successful and treats the read-data for which offset-reading is successful as the correct data, and recognizes an error when both offset-readings fail. The offset-retry-data verifying unit 102 branches the process according to a control parameter set by an external unit referred to via the control-parameter interface unit 104.

The offset-retry control unit 101 controls the output of the read-data based on the result of the verification by the offset-retry-data verifying unit 102 and outputs the read-data from the host interface unit 107 to the host computer.

The head-drive control unit 103 performs drive control of a support arm of the magnetic head based on an instruction from the offset-retry control unit 101. Normally, the head-drive control unit 103 performs drive control of the support arm of the magnetic head according to read position information of a data specified based on servo information written to the magnetic disk.

The control-parameter interface unit 104 receives selection information about processing methods when offset retry is set from outside the magnetic disk device. Specific examples of methods for receiving selection information of the processing method when offset retry is instructed from the outside via the control-parameter interface unit 104 include a method using a mode parameter of a small computer system interface (SCSI) and a method using a dip switch provided in the magnetic disk device. As is explained later, the selection information of processing methods when offset retry is set from outside the magnetic disk device is the control parameter referenced for offset-reading retry in the hard disk controller 100 using the magnetic disk. The control parameter will be explained in detail later.

The disk interface unit 105 is an interface that delivers the data read from the magnetic disk head (read-core) to the ECC processing unit 106 and that outputs the data passed from the ECC processing unit 106 to the magnetic disk head (write-core) to be written to the magnetic disk.

The ECC processing unit 106 performs ECC encoding of the write data on the magnetic disk and ECC decoding of the read-data read from the magnetic disk. The ECC processing unit 106 overwrites the same sector of the same track with the read-data that is successfully read by offset retry in either the inner direction or the outer direction according to the control parameter referred to from the outside via the control-parameter interface unit 104. Thus, the correct data can be read without performing offset-reading retry. When the read-error is output, the ECC processing unit 106 overwrites data that is uncorrectable by ECC in the same sector of the same track according to the control parameter referred to from the outside via the control-parameter interface unit 104. Thus, it is possible to always have an error output and stop the reading of incorrect data in the same track and the same sector.

The host interface unit 107 receives data to be written to the magnetic disk from the host computer, passes the data to the ECC processing unit 106, receives the data from the ECC processing unit 106 the data read from the magnetic disk, and passes the data to the host computer.

FIG. 9 is a table of setting contents of a 4-bit parameter relating to an offset-retry method. The 4-bit parameter is a control parameter set from the outside of the magnetic disk device. The 4-bit parameter consists of four bits, namely, bit0 to bit3. By providing the 4-bit parameter, branches of the process can be freely set according to the running mode of the host computer and the magnetic disk device, necessary operations can be performed as required, and the efficiency of the process can be improved.

The bit0 is information about verification permission when different data are successfully read by offset-reading in both the inner direction and the outer direction. When the bit0 indicates "0", the setting content is "report an error without performing verification". In other words, when different data are successfully read by offset-reading in both the inner direction and the outer direction, it is set unconditionally as an error and to output error information. When the bit0 indicates "1", the setting content is "perform verification to find which data is valid". In other words, when different data are successfully read by offset-readings in both the inner direction and the outer direction, it is set to verify which read-data is correct and valid. Thus, even if different data are read by offset retry reading in the inner direction and the outer direction, the correctness of the data can be highly assured by performing verification of which data is the correct data.

The bit1 is information about verification permission when the data of the offset-reading in either the inner direction or the outer direction is successfully read. When the bit1 indicates "0", the setting content is "transmit data without performing verification (end normally)". In other words, when the data of the offset-reading in either the inner direction or the outer direction is successfully read, it is set so that the read-data is unconditionally output as the correct data. When the bit1 indicates "1", the setting content is "perform verification to find whether other data is present in the same track". In other words, when the data of the offset-reading in either the inner direction or the outer direction is successfully read, it is set to verify whether other data is present in the same track by performing reduction offset retry reading or increase offset retry reading. Thus, even if offset retry reading is once successful, the correctness of the data can be highly assured by verifying whether the read-data is actually the correct data.

The bit2 is information about data destruction permission when there is an error. When the bit2 indicates "0", the setting content is "do not overwrite when there is an error". In other words, when data read-error information is output, it is set to not destroy the data in the relevant sector of the relevant track by ECC-uncorrectable data. When the bit2 indicates "1", the setting content is "overwrite with unreadable data when there is an error". In other words, when data read-error information is output, it is set to destroy the data in the relevant sector of the relevant track by overwriting with the ECC-uncorrectable data. Thus, the incorrect reading of data by future retry reading can be prevented.

The bit3 is information about overwrite permission when transmitting data. When the bit3 indicates "0", the setting content is "do not overwrite when correctly read". In other words, when data is successfully read and output, it is set to not overwrite the data in the relevant sector of the relevant track with the read-data. When the bit3 indicates "1", the setting content is "overwrite with the transmitted data". It is set to overwrite the data in the relevant sector of the relevant track with the read-data. Thus, the data is always read correctly in future retry reading.

Figure 10:
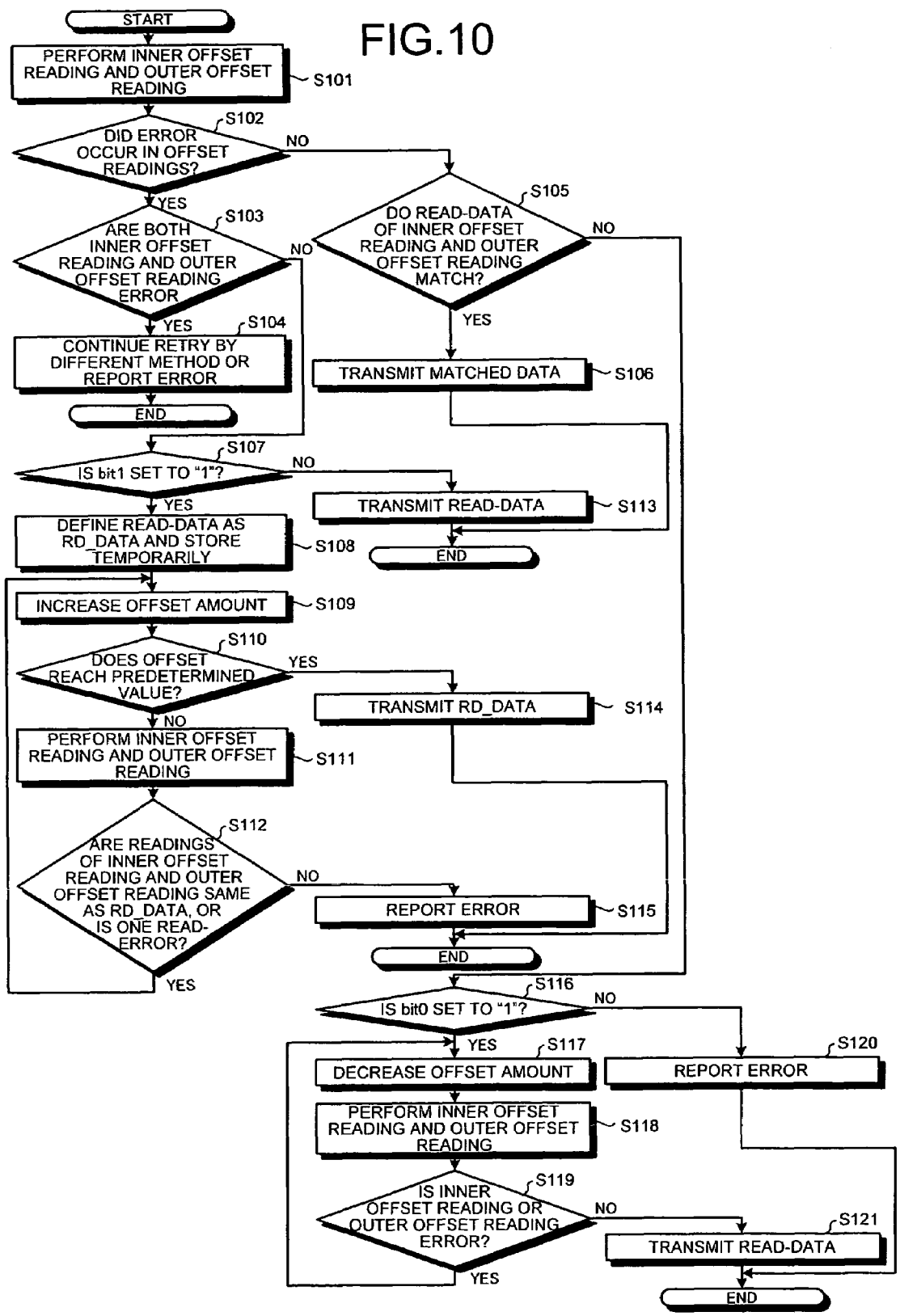
FIG. 10 is a flowchart of a processing procedure for an offset-reading retry process.

FIG. 10 is a flowchart of a procedure of the offset-reading retry process performed in the hard disk controller 100. Inner offset-reading and outer offset-reading are performed (step S101). Next, the hard disk controller 100 determines whether an error occurred in the offset-readings (step S102). When it is determined that the error occurred in the offset-readings (YES at step S102), the process moves to step S103. When it is determined that an error did not occur (NO at step S202), the process moves to step S105.

At step S103, the hard disk controller 100 determines whether both of the inner offset-reading and the outer offset-reading failed. When it is determined that both failed (YES at step S103), the hard disk controller 100 continues retrying by a different method or reports an error (step S104). When step S104 ends, the offset-reading retry process ends. When it is not determined that both failed (NO at step S103), the process moves to step S107.

At step S105, the hard disk controller 100 determines whether the read-data of the inner offset-reading and the outer offset-reading match. When it is determined that they match (YES at step S105), the matching data is transmitted to the host computer (step S106) and the offset-reading retry process ends. When it is not determined that they match (NO at step S105), the process moves to step S116.

At step S107, the hard disk controller 100 determines whether the value of bit1 is "1". When the value of bit1 is "1" (YES at step S107), the read-data is defined as RD-DATA and temporarily stored (step S108). When the value of bit1 is not "1" (NO at step S107), the read-data is transmitted to the host computer (step S113). When step S113 ends, the offset-reading retry process ends.

At step S109, the hard disk controller 100 determines whether the increased offset reaches a predetermined rated value by increasing the offset amount (step S110). When it is determined that the offset amount reaches the predetermined rated value (YES at step S110), the RD-DATA is transmitted to the host computer (step S114), and the offset-reading retry process ends. When it is not determined that the offset has reached an edge of the track (NO at step S110), inner offsetting reading and outer offset-reading are again performed (step S111).

The hard disk controller 100 determines whether the readings of inner offset-reading and the outer offset-reading are equal to the RD-DATA or any of the readings failed (step S112). When the result of step S112 is "Yes", the process moves to step S109. When the result of step S112 is No, the error is reported (step S115). When step S115 ends, the offset-reading retry process ends.

At step S116, which follows No at step S105, the hard disk controller 100 determines whether the value of bit0 is "1". When it is determined that the value of bit0 is "1" (YES at step S116), the process moves to step S117. When it is not determined that the value of bit0 is "1" (NO at step S116), the error is reported (step S120) and the offset-reading retry process ends.

At step S117, inner offset-reading and outer offset-reading are again performed by decreasing the offset amount (step S118). The hard disk controller 100 determines whether the inner offset-reading or the outer offset-reading is an error (step S119). When it is determined that the inner offset-reading or the outer offset-reading is an error. (YES at step S119), the process moves to step S117. When it is not determined that the inner offset-reading or the outer offset-reading is an error (NO at step S119), the read-data is transmitted to the host computer (step S121), and the offset-reading retry process ends.

According to the present embodiment, by increasing the difference between the write-core width and the read-core width, when different data are read in the same track by offset-readings (inner offset-reading and outer offset-reading), the transmission of incorrect data to the host computer can be prevented and reliability can be increased by performing assurance of the data.

Specifically, when the read-error occurs, reading is performed offsetting on both the inner side and the outer side of the track and the data are compared to each other for verification, whereby preventing transmission of the incorrect data in the track and the sector having offset-written data to the host computer.

According to an embodiment of the present invention, when a comparison result of the data read by inner offsetting and the data read by outer offsetting match, the read-data is output. Thus, the correctness of the read-data is assured by offsetting and the correct data is output.

Furthermore, according to an embodiment of the present invention, when the comparison result of the data read by inner offsetting and the data read by outer offsetting do not match, offset data reading is performed by stepwise reduction of both the offset amount in the inner direction and the offset amount in the outer direction by the same amount, and when an error occurs in the data read by one of the offsets and data reading by the other offset is normally performed, the read-data of the other offset is output. Thus, the correctness of the read-data is assured by offsetting and the correct data is output.

Moreover, according to an embodiment of the present invention, when either of the data read by inner offsetting and the data read by outer offsetting is successful, offset data reading is performed by stepwise increase of both the offset amount in the inner direction and the offset amount in the outer direction by the same amount, and when an error occurs in the data reading by one of the offsets and data reading by the other offset is normally performed, the read-data of the other offset is output. Thus, the correctness of the read-data is assured by offsetting and the correct data is output.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device that performs an assurance of read-data that is read by an offset-reading retry process of retrying an offset reading in an inner direction toward a center of a storage medium and in an outer direction toward a circumference of the storage medium, when a data read-error occurs near a track center of the storage medium, the storage device comprising:
   a data reading unit that reads inner offset data from an inner-direction offset reading and outer offset data from an outer-direction offset reading;
   a data comparing unit that compares the inner offset data and the outer offset data read by the data reading unit; and
   a data-output control unit that outputs the read-data when a result of comparison by the data comparing unit indicates that the inner offset data matches the outer offset data.

2. The storage device according to claim 1, wherein when reading of either one of the inner offset data and the outer offset data by the data reading unit is successful, the data-output control unit outputs the read-data that is successfully read.

3. The storage device according to claim 1, wherein when the inner offset data does not match the outer offset data, the data reading unit performs the offset-reading by decreasing offset amounts in the inner direction and the outer direction by the same amount in a stepwise manner, and
   when an error occurs in one of the inner-direction offset reading and the outer-direction offset reading and when other of the inner-direction offset reading and the outer-direction offset reading is performed normally, the data-output control unit outputs the read-data obtained by the other of the inner-direction offset reading and the outer-direction offset reading.

4. The storage device according to claim 3, further comprising:
   a read-data overwriting unit that overwrites, when the read-data obtained by the other of the inner-direction offset reading and the outer-direction offset reading is output, the read-data in an entire region of a track and a sector from which reading of the read-data is successful.

5. The storage device according to claim 4, further comprising:
   a selecting unit that selects, when the read-data obtained by the other of the inner-direction offset reading and the outer-direction offset reading is output, whether to overwrite the read-data in the entire region of the track and the sector from which reading of the read-data is successful.

6. The storage device according to claim 1, wherein when either one of the inner-direction offset reading and the outer-direction offset reading is successful, the data reading unit performs the offset-reading by increasing offset amounts in the inner direction and the outer direction by the same amount in a stepwise manner, and
   when an error occurs in one of the inner-direction offset reading and the outer-direction offset reading and when other of the inner-direction offset reading and the outer-direction offset reading is performed normally, the data-output control unit outputs the read-data obtained by the other of the inner-direction offset reading and the outer-direction offset reading.

7. The storage device according to claim 6, further comprising:
   a read-data overwriting unit that overwrites, when the read-data obtained by the other of the inner-direction offset reading and the outer-direction offset reading is output, the read-data in an entire region of a track and a sector from which reading of the read-data is successful.

8. The storage device according to claim 7, further comprising:
   a selecting unit that selects, when the read-data obtained by the other of the inner-direction offset reading and the outer-direction offset reading is output, whether to overwrite the read-data in the entire region of the track and the sector from which reading of the read-data is successful.

9. The storage device according to claim 1, wherein
when the inner offset data does not match the outer offset data, the data-output control unit outputs read-error information.

10. The storage device according to claim 9, further comprising:
an uncorrectable-data overwriting unit that overwrites, when the read-error information is output by the data-output control unit, uncorrectable data that is uncorrectable by an error correcting code in an entire region of a track and a sector from which the read-error occurred.

11. The storage device according to claim 10, further comprising:
a selecting unit that selects whether to overwrite the uncorrectable data in the entire region of the track and the sector from which the read-error occurred.

12. The storage device according to claim 1, wherein
when either one of the inner-direction offset reading and the outer-direction offset reading is successful, the data reading unit performs the offset-reading by increasing offset amounts in the inner direction and the outer direction by the same amount in a stepwise manner, and
when both the inner-direction offset reading and the outer-direction offset reading by the data reading unit are successful and when the inner offset data does not match the outer offset data, the data-output control unit outputs read-error information.

13. The storage device according to claim 12, further comprising:
an uncorrectable-data overwriting unit that overwrites, when the read-error information is output by the data-output control unit, uncorrectable data that is uncorrectable by an error correcting code in an entire region of a track and a sector from which the read-error occurred.

14. The storage device according to claim 13, further comprising:
a selecting unit that selects whether to overwrite the uncorrectable data in the entire region of the track and the sector from which the read-error occurred.

15. The storage device according to claim 1, further comprising:
a selecting unit that, when the inner offset data does not match the outer offset data, selects one from
outputting read-error information; and
outputting the read-data obtained by performing the offset-reading by decreasing offset amounts in the inner direction and the outer direction by the same amount in a stepwise manner, the read-data being obtained by the offset data that is performed normally when an error occurs in one of the inner-direction offset reading and the outer-direction offset reading and when other of the inner-direction offset reading and the outer-direction offset reading is performed normally.

16. The storage device according to claim 1, further comprising:
a selecting unit that, when a data reading of either one of the inner offset data and the outer offset data by the data reading unit is successful, selects one from outputting the read-data that is successfully read; and
outputting the read-data obtained by performing the offset-reading by decreasing offset amounts in the inner direction and the outer direction by the same amount in a stepwise manner, the read-data being obtained by the offset data that is performed normally when an error occurs in one of the inner-direction offset reading and the outer-direction offset reading and when other of the inner-direction offset reading and the outer-direction offset reading is performed normally.

17. A data-assurance control apparatus that performs an assurance of read-data that is read by an offset-reading retry process of retrying an offset reading in an inner direction toward a center of a storage medium and in an outer direction toward a circumference of the storage medium, when a data read-error occurs near a track center of the storage medium, the data-assurance control apparatus comprising:
a data comparing unit that compares inner offset data read from an inner-direction offset reading and outer offset data read from an outer-direction offset reading; and
a data-output control unit that outputs the read-data when a result of comparison by the data comparing unit indicates that the inner offset data matches the outer offset data.

18. The data-assurance control apparatus according to claim 17, wherein
when reading of either one of the inner offset data and the outer offset data is successful, the data-output control unit outputs the read-data that is successfully read.

19. The data-assurance control apparatus according to claim 17, wherein
when the inner offset data does not match the outer offset data, the offset-reading is performed by decreasing offset amounts in the inner direction and the outer direction by the same amount in a stepwise manner, and
when an error occurs in one of the inner-direction offset reading and the outer-direction offset reading and when other of the inner-direction offset reading and the outer-direction offset reading is performed normally, the data-output control unit outputs the read-data obtained by the other of the inner-direction offset reading and the outer-direction offset reading.

20. A read-data assurance method of performing an assurance of read-data that is read by an offset-reading retry process of retrying an offset reading in an inner direction toward a center of a storage medium and in an outer direction toward a circumference of the storage medium, when a data read-error occurs near a track center of the storage medium, the read-data assurance method comprising:
reading inner offset data from an inner-direction offset reading and outer offset data from an outer-direction offset reading;
comparing the inner offset data and the outer offset data read at the reading; and
outputting the read-data when a result of comparison at the comparing indicates that the inner offset data matches the outer offset data.

* * * * *